United States Patent Office 3,655,652
Patented Apr. 11, 1972

1

3,655,652
AROMATICALLY-UNSATURATED
9α-METHYL STEROIDS
Robert V. Coombs, Summit, and Eugene E. Galantay,
Morristown, N.J., assignors to Sandoz-Wander, Inc.,
Hanover, N.J.
No Drawing. Filed July 23, 1969, Ser. No. 844,183
Int. Cl. C07c 173/00
U.S. Cl. 260—239.55 C                11 Claims

ABSTRACT OF THE DISCLOSURE

The compounds are 13-(lower)alkyl-9α-methyl-gona-1,3,5(10)-trienes which may be substituted at the 3 and 17 positions, e.g., 3 - methoxy-9α-methylestra-1,3,5(10)-trien-17-one. The compounds are useful as pharmaceuticals.

This invention relates to steroidal compounds, and more particularly to 13-alkyl-substituted aromatically unsaturated gonane compounds having a 9α-methyl substituent, as well as to methods of preparing such compounds and to intermediates in the preparation of such compounds. This invention also relates to pharmaceutical compositions containing such compounds and to the use of said compositions.

The above-mentioned aromatically unsaturated gonane compounds may be conveniently represented by the Formula I:

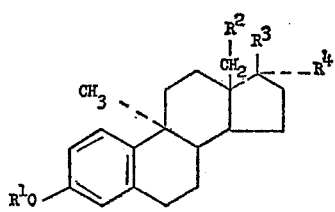

wherein $R^1$ is a hydrogen atom, tetrahydropyran-2-yl, tetrahydrofuran-2-yl, carboxylic acyl or lower alkyl, e.g. having from 1 to 12 carbon atoms, such as methyl, ethyl, propyl, and butyl including their isomeric forms, or cycloalkyl, e.g. having from 5 to 7 carbon atoms in the ring;
$R^2$ is a hydrogen atom or alkyl having from 1 to 2 carbon atoms, i.e. methyl or ethyl;
$R^3$ is hydroxy or acyloxy;
$R^4$ is a hydrogen atom or alkyl or alkynyl having from 1 to 3 carbon atoms, e.g. methyl, ethyl, propyl, isopropyl, ethynyl or propynyl;

$R^3$ and $R^4$ taken together can also represent a keto group;
$R^4$ is a hydrogen atom and $R^3$ is acetyl.

The carboxylic acyl and acyloxy groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloro-propionate, adamantoate, dichloroacetate and the like.

A key intermediate in the preparation of compounds I is a compound III i.e. a 13-(loweralkyl-17-ethylenedioxy-3-methoxy-9α-methyl-gona-1,3,5(10)-trien-11-one:

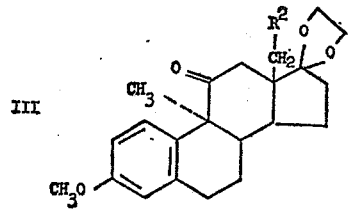

wherein $R^2$ is as defined above.
Compound III is obtainable by methylating (process 1) a compound II i.e. a 13-(lower)alkyl-17-ethylenedioxy-3-methoxy-gona-1,3,5(10)-triene-11-one:

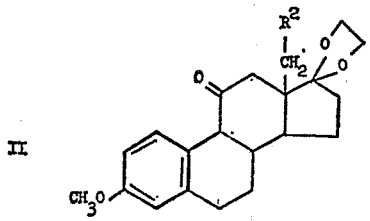

wherein $R^2$ is as defined above. Compounds II can be obtained by procedures described hereinafter.

The methylation (process 1) may be carried out by reacting a compound II with a methylating agent in the presence of a strong base at a temperature of from about −10° to 60° C., in a suitable solvent.

The methylating agent, i.e. the compound Q may be represented by the formula:

$$CH_3-Z \qquad (Q)$$

wherein

Z is a nucleofugal leaving group, e.g., a halogen atom having an atomic weight of from 35 to 127, tosylate, and —O—S—O$_3$—CH$_3$.

The strong base, i.e., a compound B, may be conveniently represented by the formula:

$$M-A \qquad (B)$$

wherein

A is lower alkoxy, e.g., having from 1 to 6 carbon atoms, such as methyl, ethyl, propyl, butyl, amyl and hexyl and their isomeric forms, or the anion —NH$_2$, —H or —CH$_2$SO—CH$_3$, and the like; and
M is an alkali metal, e.g., Na or K.

Process 1 should be carried out in a suitable solvent, e.g., t-butanol or dimethyl sulfoxide; however, where the methylating agent is liquid under the reaction conditions, excess methylating agent may serve as solvent.

It is preferred to employ the methylating agent in excess, particularly in such a large excess that it serves as solvent, i.e., reaction medium, e.g., on the order of from about 10 to 200 fold excess.

Reaction conditions conventionally applied to C-methylation reactions are therefore applied.

Compound III, i.e., a 13-(lower)alkyl-17-ethylenedioxy-3-methoxy-gona-1,3,5(10)-trien-11-one (obtained by process 1) is then reduced to its corresponding compound IV (process 2), i.e., the carbonyl function at the 11-position is converted to methylene unit, by means conventionally employed for reducing a carbonyl to a methylene structure, e.g., the well-known Wolff-Kishner reduction.

The ethylenedioxy function at the 17-position of the compound IV is then acid cleaved (process 3) to yield the corresponding compound V, i.e., a 13-(lower)alkyl-3-methoxy - 9α-methyl-gona-1,3,5(10)-trien-17-one. Process 3 may be carried out in the conventional manner for cleaving a ketal linkage, e.g., by refluxing with p-toluene sulfonic acid in methanol.

The above described processes 1, 2 and 3 may be conveniently represented by Reaction Scheme A, below, wherein $R^2$ is as defined above.

REACTION SCHEME A

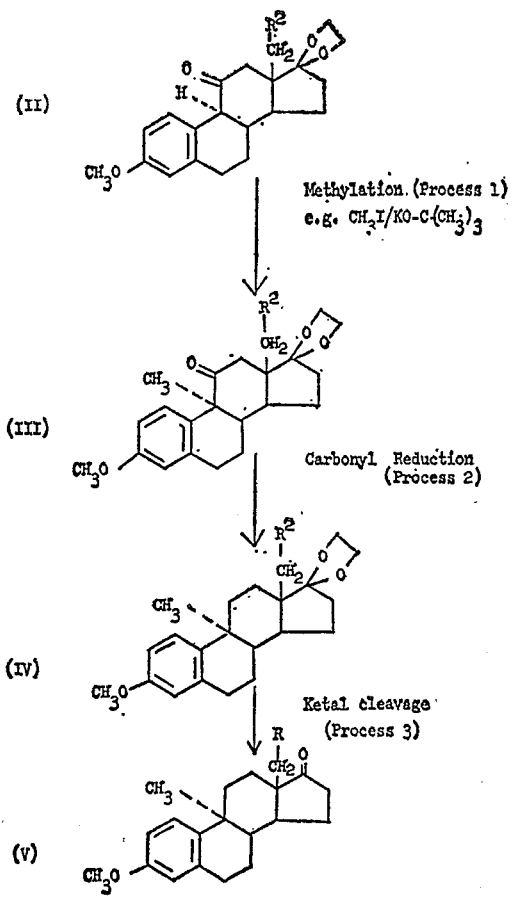

Compounds II, employed in Process 1, described above, may be obtained by first methylating a suitable 13-lower alkyl - 17-ethylenedioxygona-1,3,5(10)-trien-3,11-diol i.e. a compound A, to obtain the corresponding 3-methoxy analog which is then oxidized to convert the 11-hydroxy position to a carbonyl function. The methylation (process (a)) and the oxidation (process (b)) may be carried out by conventional means for the etherification and the oxidation of a secondary alkyl hydroxy function to a carbonyl function, respectively. Compounds A are either known and may be prepared by methods described in the literature or where not known may be prepared in a manner analogous to that described in the literature or by obvious means.

As will be readily appreciated by those skilled in the art, a class of compounds I, i.e. compounds V, may be obtained by the following processes 1, 2 and 3 and that such 17-keto-compounds can be converted to other classes of compounds I by the application of conventional processes. The selection of any particular procedures to be employed and the sequence of their application is within the skill of those skilled in the art. Procedures for such interconversions are described below.

For example, a Compound V may be reacted at the 17-carbonyl function with a suitable metallo-organic reagent.

$$RX^4—X$$

wherein $R^4$ is as defined above and X is an active metal or active metal-containing ion, to obtain the corresponding Compound I wherein the 17- position bears β-hydroxy and α-$R^4$ substituents (Process I).

The selection of the metallo-organic reagent is dependent on the specific type of $R^4$-substituent desired as is conveniently represented in Table A, below. The selection of a particular reagent and use thereof by well-known methods (Process I) is within the skill of persons skilled in the art.

TABLE A

| $R^4$ type | Preferred X— |
|---|---|
| —H | —(LiAlH₃), —(NaBH₃) |
| lower alkynyl | Li—, Na—, BrMg— |
| —lower alkyl | IMg—, BrMg—, Li— |

The 3-methoxy substituent of a compound V may be cleaved (Process II) to obtain the corresponding 3-hydroxy analog (Compound VI).

The cleavage may be carried out for example by heating the Compound V with pyridine·HCl at from about 100 to 200° C., preferably at 180° C.

Compounds I bearing a protected-hydroxy function at position 3- may be prepared in the conventional manner (Process IIIa) and the protecting group, i.e. a tetrahydrofuran-2-yl or tetrahydropyran-2-yl moiety, removed as desired by conventional means, (Process IIIb) such as acid cleavage. For example, dihydrofuran or dihydropyran may be reacted with a Compound VI in the presence of an acidic catalyst, such as p-toluene sulfonic acid or phosphorous oxychloride.

Compounds I wherein $R^1$ is alkyl or cyclo-alkyl may be obtained by reacting a 3-hydroxy-containing compound in conventional manner for alkylating a phenolic hydroxy function (Process IV). A suitable alkylating reagent, $$R^1—Z$$

wherein $R^1$ is lower alkyl or cycloalkyl as defined for $R^1$ above, and Z is a nucleofugal group, in this under basic conditions may be employed in Process IV. Representative of Process IV are (1) dimethyl sulfate in ethanol in the presence of potassium hydroxide; (2) diethyl sulfate in t-butanol in the presence of potassium t-butoxide and (3) nonylbromide in dioxane in the presence of sodium hydride.

Compounds I bearing a hydroxy group at any of positions 3- and 17- may be acylated to obtain those Compounds I wherein any of $R^1$ is carboxylic acyl and $R^4$ is acyloxy as defined above (Process V).

The acylation (Process V) may be effected by processes known per se for the acylation of steroid alcohols. With respect to compounds of class I having two hydroxy groups, it will be noted that, a hydroxy group at the 3-position is phenolic and a hydroxy group at the 17β-position is tertiary. As one skilled in the art will be aware, the ease of acylation is phenolic>tertiary and the ease of re-saponification is clearly phenolic>tertiary. Accordingly, acylating agents and the stringency of acylating conditions can be chosen depending on the degree of acylation required employing conventional techniques. Suitable acylating agents for the 3-position include acids, acyl halides and acid anhydrides of formulae acyl-OH, acyl-Hal and (acyl)₂O, respectively, wherein acyl is as defined above, and Hal signifies bromine or chlorine, and mixtures thereof. Where the desired acyl moiety is acetyl, a preferred acylating agent is acetic anhydride. In carrying out the acylation, inert solvent may be employed or excess acylating agent may serve as solvent. An acid-binding agent, e.g., pyridine, is preferably used. Preferred temperatures vary between —10 and 50° C. For acylation of both positions, more stringent conditions may be used, characterized by the presence of a strongly acidic catalyst, e.g., p-toluenesulphonic acid, perchloric acid and the like. If such catalysts are used, in addition to the above-listed acylating agents, enol acylates, preferably esters of "isopropenyl alcohol," e.g., isopropenyl acetate, may also be employed. The considerations involved are well within the scope of one skilled in the art.

Furthermore, the diester form of Compound I may be selectively saponified employing conventional means, e.g., by treatment with methanolic potassium bicarbonate, to obtain the corresponding 3-hydroxy-17β-acyloxy-substituted Compound I. Hence, one skilled in the art can use such knowledge to obtain the desired combination of free hydroxy and acylated positions.

The class of Compounds I wherein $R^3$ is acetyl and $R^4$ is a hydrogen atom, i.e., compounds X, are obtainable by a series of reaction steps (taken together as Process VI) which involves reacting a Compound V with the reagent:

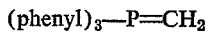

to obtain the corresponding 17-ethylidene-substituted Compound I, i.e. Compound VIII, (step a); which product is then "hydrated," i.e. the 17-ethylidene-compound is converted to a 17β-1-hydroxyethyl, 17α-hydrogen-containing compound IX. The "hydration" (Step b) may be effected by use of a "hydroboration" technique, e.g., by treatment with borane followed by treatment with hydrogen peroxide under basic conditions. The 1-hydroxyethyl group of the compound IX is then oxidized to an acetyl function (Step c). The oxidation may be carried out employing conventional methods of oxidizing a secondary alcohol to a carbonyl, e.g., using chromium trioxide in pyridine or acetone; the "Oppenauer reaction" or silver carbonate in boiling benzene.

If desired the method of process VI can be applied to a 3-tetrahydropyran-2-yloxy or 3-tetrahydrofuran-2-yloxy-substituted analog of the above-mentioned 3-methoxy compounds (Compound V) to obtain the corresponding 17β-acetyl-substituted compound; ether cleavage (Process IIIb) of such product yielding the 3-hydroxy analog.

The compounds I are useful because they possess pharmacological activity in animals. In particular, compounds I are useful as estrogenic agents, as indicated by observing increase in white mouse uterine weight, e.g. as described in Endocrinology 65, 265 (1959).

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.1 milligram to 30 milligrams. This daily dosage may be given in a single dose or divided doses, e.g., 2 times a day, or in sustained release form, independent of body weight. Dosage forms suitable for internal administration comprise from about 0.05 milligram to about 30 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| 17α-ethynyl-3-methoxy - 9α - methylestra-1,3,5-(10)-trien-17β-ol | 0.5 |
| Tragacanth | 2 |
| Lactose | 89 |
| Corn starch | 5 |
| Talcum | 3 |
| Magnesium stearate | 0.5 |

The following examples are provided as illustrative of the present invention. However, it is to be understood that the examples are for the purposes of illustration only and are not intended as in any way limiting the scope of the invention. In the examples all temperatures are centigrade and room temperature is 25°, unless indicated otherwise.

EXAMPLE 1

3-methoxy-9α-methylestra-1,3,5(10)-trien-17-one

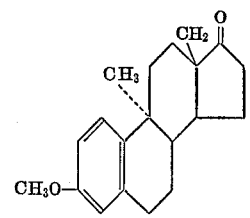

This example illustrates the preparation of a compound V.

Step A.—17-ethylenedioxy-11β-hydroxy-3-methoxyestra-1,3,5(10)-triene (a compound A by process (a))

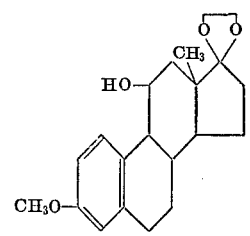

A mixture of 15 g. of 17-ethylenedioxyestra-1,3,5(10)-trien-3,11β-diol and 30 g. of anhydrous potassium carbonate in 75 ml. of methanol and 60 ml. of methyl iodide is stirred and heated under reflux for 3 hours. The mixture is then cooled and diluted by the addition of 200 ml. of water. The methanol and methyl iodide are removed by distillation under reduced pressure and the aqueous residue is extracted twice with methylene chloride. The combined organic extracts are washed with saturated sodium chloride solution and dried over sodium sulfate. Removal of the solvent gives a residue which is crystallized from ether to yield 17-ethylenedioxy-11β-hydroxy-3-methoxyestra-1,3,5(10)-triene, M.P. 125–126° C.

Step. B.—17-ethylenedioxy-3-methoxyestra-1,3,5(10)-triene-11-one (a compound II by process (b))

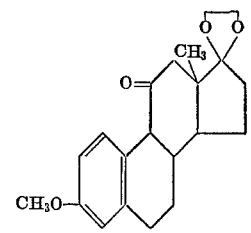

To a stirred solution of 5.15 g. of 17-ethylenedioxy-11β-hydroxy-3-methoxyestra-1,3,5(10)-triene in 25 ml. of dimethylsulfoxide and 25 ml. of benzene is added 3 ml. of pyridine and 9.3 g. of N,N-dicyclohexylcarbodiimide. This mixture is then cooled and 1.5 ml. of dichloroacetic acid is added. The whole is next stirred at room temperature for 1½ hours. It is diluted by the addition of 50 ml. of ether and a solution of 4 g. of oxalic acid in 10 ml. of methanol is added dropwise. The resulting suspension is stirred for 40 minutes at room temperature and then filtered. The filtrate is concentrated to dryness and distributed between methylene chloride and a 10% aqueous solution of sodium bicarbonate. The organic phase is washed with water and dried (Na₂SO₄) before being evaporated to dryness under reduced pressure. The residue is placed on a column of silica-gel and eluted with chloroform containing various percentages of methanol. The fractions eluted with chloroform containing 5% of methanol are combined and evaporated to yield a residue which is crystallized from hexane/ether (1:1). Thus is obtained 17-ethylenedioxy - 3 - methoxy-estra-1,3,5(10)-trien-11-one, M.P. 122–123° C.

Step C.—17-ethylenedioxy-3-methoxy - 9α - methylestra-1,3,5(10)-trien-11-one (a compound III by Process 1)

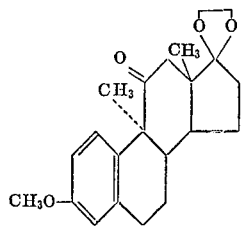

To a stirred, ice cooled solution of 10.5 g. of 17-ethylene - dioxy - 3 - methoxy - estra - 1,3,5(10)-trien-11-one in 300 ml. of methyl iodide under an atmosphere of nitrogen is added, over 10 minutes, 120 ml. of a 1.1 molar solution of potassium tert.-butoxide in t-butyl alcohol. The temperature is allowed to rise to room temperature and the mixture is then stirred for 18 hours. It is next poured onto 500 ml. of water and extracted with methylene chloride, twice. The combined organic extracts are washed with water and dried over sodium sulfate. Removal of the solvent gives an oil which is crystallized from ether to yield 17-ethylenedioxy - 3 - methoxy - 9α - methylestra-1,3,5(10)-trien-11-one. M.P. 142–145° C.

Step D.—17-ethylenedioxy-3-methoxy-9α-methylestra-1,3,5(10)-triene (a compound IV by Process 2)

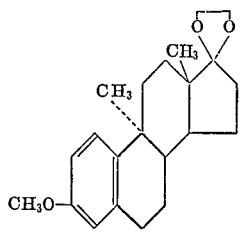

A mixture of 534 mg. of 17-ethylenedioxy-3-methoxy-9α-methylestra-1,3,5(10)-trien-11-one, 1 g. of hydrazine dihydrochloride and 5 g. of hydrazine hydrate in 35 g. of triethyleneglycol is heated to a temperature of 130° and maintained there for 2½ hours. After this time, 1.8 g. of potassium hydroxide pellets is added and the temperature raised to 210°. This temperature is also maintained for 2½ hours whilst a mixture of hydrazine and water is slowly allowed to distilled out. The reaction mixture is cooled and diluted with water affording a precipitate which is collected by filtration. The solid is dissolved in methylene chloride and the organic solution is dried over sodium sulfate. Removal of the solvent leaves a residue which is crystallized from hexane-ether to yield 17-ethylenedioxy - 3 - methoxy - 9α - methylestra - 1,3,5(10)-triene, M.P. 115° C.

Step E.—3-methoxy-9α-methylestra-1,3,5(10)-trien-17-one (by Process 3)

To a warm solution of 220 mg. of 17-ethylendioxy-3-methoxy-9α-methylestra-1,3,5(10)-triene in 5 ml. of methanol is added 1 ml. of 2 N hydrochloric acid solution and the mixture is heated under reflux for 5 minutes. On cooling, crystals are precipitated and these are isolated by filtration. The crystalline solid is washed with a small quantity of ether to yield-3-methoxy-9α-methylestra-1,3,5(10)-trien-17-one, M.P. 190°–192° C.

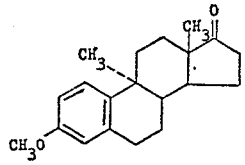

Step C of this example (1) may be carried out as described except that the methyliodide therein is replaced by an equivalent amount of either dimethyl sulfate or methyl mesylate as the methylating agent.

Step C of this Example 1 may be carried out as described except that the potassium tertiary-butoxide used therein is replaced by an equivalent amount of sodium methyl sulfinylide in 10 times the volume of dimethyl sulfoxide.

EXAMPLE 2 (COMPOUND III)

Carrying out the methylation process of Step C of Example 1, but replacing the compound II, i.e., 17-ethylenedioxy-3-methoxyestra - 1,3,5(10) - triene - 11 - one, used therein with an equivalent amount of the compound II listed below (column A) there is obtained the compound III listed in (column B).

| A (II) | B (III) |
| --- | --- |
| (a) 13-ethyl-17-ethylenedioxy-3-methoxygona-1,3,5(10)-trien-11-one. | (a) 13-ethyl-17-ethylenedioxy-3-methoxy-9α-methylgona-1,3,5(10)-trien-11-one. |
| (b) 13-propyl-17-ethylenedioxy-3-methoxygona-1,3,5(10)-trien-11-one. | (b) 13-propyl-17-ethylenedioxy-3-methoxy-9α-methylgona-1,3,5(10)-trien-11-one. |

EXAMPLE 3 (COMPOUND IV)

Repeating the reduction process described in Step D of Example 1, but replacing the compound III used therein, i.e. 17 - ethylenedioxy - 3 - methoxy - 9α - methylestra-1,3,5(10)-trien-11-one with an equivalent amount of the compound III listed below under column A, there is obtained the compound IV listed in column B.

| A (III) | B (IV) |
| --- | --- |
| (a) 13-ethyl-17-ethylenedioxy-3-methoxy-9α-methylgona-1,3,5(10)-trien-11-one. | (a) 13-ethyl-17-ethylenedioxy-3-methoxy-9α-methylgona-1,3,5(10)-triene. |
| (b) 17-ethylenedioxy-3-methoxy-9α-methyl-13-propylgona-1,3,5(10)-trien-11-one. | (b) 17-ethylenedioxy-3-methoxy-9α-methyl-13-propylgona-1,3,5(10)-triene. |
| (c) 17-ethylenedioxy-9α-methyl-3-tetrahydropyranyloxyestra-1,3,5(10)-trien-11-one. | (c) 17-ethylenedioxy-9α-methyl-3-tetrahydropyranyl oxyestra-1,3,5(10)-triene. |

EXAMPLE 4 (COMPOUND V)

Repeating the ether cleavage process described in Step E of Example 1 but replacing the compound IV used therein, i.e. 17-ethylenedioxy-3-methoxy-9α-methylestra-1,3,5(10)-triene with an equivalent amount of the compound IV listed below under column A, there is obtained the compound V listed in column B.

| (A (IV) | B (V) |
| --- | --- |
| (a) 13-ethyl-17-ethylenedioxy-3-methoxy-9α-methylgona-1,3,5(10)-triene. | (a) 13-ethyl-3-methoxy-9α-methylgona-1,3,5(10)-trien-17-one. |
| (b) 17-ethylenedioxy-3-methoxy-9α-methylgona-1,3,5(10)-triene. | (b) 3-methoxy-9α-methyl-13-propylgona-1,3,5(10)-trien-17-one. |

EXAMPLE 5

9α-methylestrone (by Process IIIb)

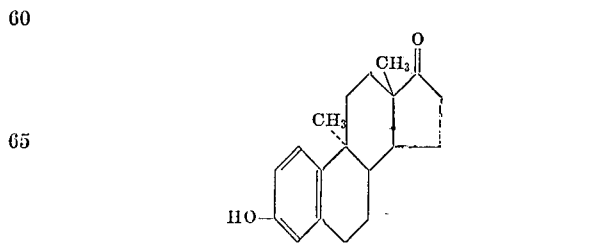

A solution of 300 mg. of 17-ethylenedioxy-9α-methyl-3-tetrahydropyranyloxyestra-1,3,5(10)-triene and 150 mg. of p-toluene-sulfonic acid in 5 ml. of 95% ethanol is kept at room temperature for 24 hours. Water is added and the product extracted with methylene chloride.

EXAMPLE 6

3-hydroxy-9α-methylestra-1,3,5(10)-trien-17-one

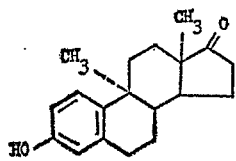

This example illustrates the preparation of a Compound VI by process II from a Compond V.

An intimate mixture of 2 g. pyridine hydrochloride and 300 mg. of 3-methoxy-9α-methylestra-1,3,5(10)-trien-17-one is kept at 180° for 15 minutes. After cooling, water (20 ml.) is added and the product extracted with methylene chloride.

Carrying out the process of this Example (6) but replacing the compound V, i.e. 3-methoxy-9α-methylestra-1,3,5(10)-trien-17-one used therein with an equivalent amount of (a) 13-ethyl-3-methoxy-9α-methylgona-1,3,5(10)-trien-17-one or (b) 9α-methyl-3-methoxy-13-propylgona-1,3,5-(10)-trien - 17 - one there is obtained the corresponding compound VI, i.e. (a) 13-ethyl-3-hydroxy-9α-methylgona-machines are obsolete, and the operator as well." Give 1,3,5(10)-trien-17-one, or (b) 3-hydroxy-9α-methyl-13-propylgona-1,3,5(10)-trien-17-one, respectively.

EXAMPLE 7

3-methoxy-9α-methylestra-1,3,5(10)-trien-17β-ol (by Process I)

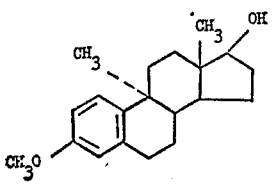

To a solution of 362 mg. of 3-methoxy-9α-methylestra-1,3,5(10)-trien-17-one in a mixture of 5 ml. of methylene chloride and 5 ml. of anhydrous ethanol, there is added, at +50, 80 ml. of sodium borohydride and the mixture is stirred at 0 to 5° for 3 hours. 10 ml. of saturated aqueous tartaric acid solution is then added and the methylene chloride layer worked up (separation, washing, drying over sodium sulfate and evaporation) to yield the title product.

Carrying out the process of this Example (7), but using instead the 13-ethyl or 13-propyl analogs of the compound V, i.e. 3-methoxy-9α-methylestra-1,3,5(10)-trien-17-one, there is obtained 13-ethyl-3-methoxy-9α-methylgona-1,3,5(10)-trien-17β-ol, or 3-methoxy-9α-methyl-13-propylgona-1,3,5(10)-trien-17β-ol, respectively.

EXAMPLE 8

17α-ethynyl-3-methoxy-9α-methylestra-1,3,5(10)-trien-17β-ol (by Process I)

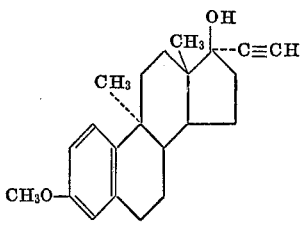

To a mixture of 2.1 g. of lithium acetylide-ethylenediamine complex in 15 ml. of anhydrous dimethyl acetamide, there is added 825 mg. of 3-methoxy-9α-methylestra-1,3,5(10)-trien-17-one. After 2 hours at 20°, the mixture is poured onto 100 ml. of 2 N hydrochloric acid. The title product which separates as a solid, is removed by filtration and purified by recrystallization from ethyl acetate-hexane.

EXAMPLE 9

13,17α-diethyl-3-methoxy-9α-methylgona-1,3,5(10)-trien-17β-ol (by process I)

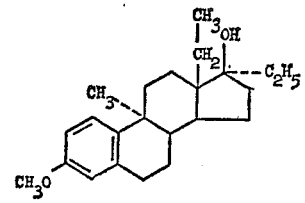

To a Grignard mixture prepared from 0.52 g. of magnesium and 2.1 ml. of ethyl bromide in 20 ml. of anhydrous tetrahydrofuran, there is dropwise added, at 60°, a solution of 425 mg. of 13-ethyl-3-methoxy-9α-methylgona-1,3,4(10)-trien-17-one in 8 ml. of tetrahydrofuran. Under nitrogen atmosphere, the mixture is refluxed for 5 hours, then cooled, decomposed with the addition of 15 ml. of saturated ammonium chloride solution and extracted with chloroform. The title product is obtained on the evaporation of the dried and washed ($H_2O$) chloroform solution and is purified by recrystallization from ethanol.

The procedure of this Example (9) is repeated using in place of the compound V, i.e. 13-ethyl-3-methoxy-9α-methylgona-1,3,5(10)-trien-17-one, an equivalent amount of 9α - methyl - 13 - propyl - 3-tetrahydropyranyloxygona-1,3,5(10)-trien-17-one to obtain 17α-ethyl-9α-methyl-13-propyl - 3 - tetrahydropyranyloxygona - 1,3,5(10) - trien-17α-ol.

EXAMPLE 10

9α-methyl-3-tetrahydrofuranyloxyestra-1,3,5(10)-trien-17-one (by Process IIIα)

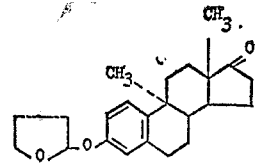

To a mixture of 15 ml. of benzene, 3 ml. of dihydrofuran and 1.2 g. of phosphorus oxychloride there is added a benzene (3 ml.) solution of 3-hydroxy-9α-methylestra-1,3,5(10)-trien-17-one. After 18 hours at room temperature, the mixture is poured over 50 g. of ice containing 5 g. of sodium carbonate; the benzene layer is separated, washed and evaporated to give the title product which is then purified by recrystallization from ether.

EXAMPLE 11

3,17β-dihydroxy-13,17α-dipropyl-9α-methylgona-1,3,5(10)-triene (by Process IIIb)

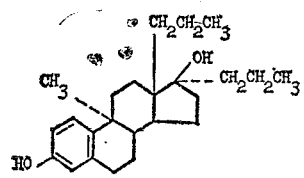

A mixture of 13,17α-dipropyl-9α-methyl-3-tetrahydrofuranyloxygona-1,3,5(10)-trien-17β-ol (386 mg.), p-toluenesulfonic acid (120 mg.) and methanol (15 ml.) is kept at 25° for 12 hours. Water (30 ml.) is added and the title product isolated by filtration.

EXAMPLE 12

3-isopropyloxy-13-ethyl-9α-methylgona-1,3,5(10)-trien-17-one (by Process IV)

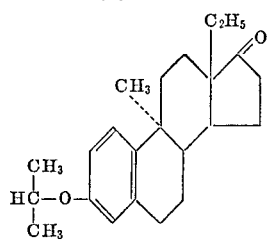

A solution of 13-ethyl-3-hydroxy-9α-methylgona-1,3,5(10)-trien-17-one (500 mg.) in boiling isopropyl alcohol (20 mg.) is alternately treated with small portions of sodium isopropylated and isopropyl diodide until analytical thin layer chromatography indicates the disappearance of starting material. Water is then added (100 ml.) and the title product removed by filtration. It is purified by chromatography on alumina (Grade 3) using benzene as an eluent.

Carrying out the procedure of this example but replacing the 13-ethyl-3-hydroxy-9α-methylgona-1,3,5(10)-trien-17-one used therein with 3-hydroxy-9α-methylestra-1,3,5(10)-trien-17-one there is obtained 3-isopropoxy-9α-methylestra-1,3,5(10)-trien-17-one.

Carrying out the procedure of this example (12), but replacing the isopropyl alcohol, the sodium isopropylate and the isopropyl iodide used therein with equivalent amounts of t-butanol, potassium t-butylate and cyclopentyl bromide, respectively, there is obtained 3-cyclopentyloxy-13-ethyl-9α-methylgona-1,3,5(10)-trien-17-one.

EXAMPLE 13

9α-methylestrone acetate (by Process V)

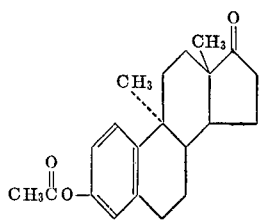

A solution of 350 mg. of 9α-methylestrone and of 1.2 g. of acetic anhydride in 10 ml. of pyridine is kept at 0° for 18 hours and then poured on ice-water whereupon the crystalline title product is filtered off and purified by recrystallization from ethyl acetate.

Repeating the procedure of this example (13) but replacing the 9α - methylestrone with 9α - methylestra-1,3,5(10)-trien-3,17-diol used therein (in an equivalent amount) there is obtained 3-acetyloxy-9α-methylestra-1,3,5(10)-trien-17-ol.

EXAMPLE 14

3,17β-diacetoxy-17α-ethyl-9α-methylestra-1,3,5(10)-triene (by Process V)

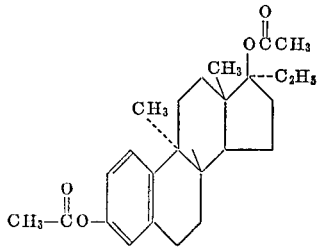

1 g. of 17α-ethyl-9α-methylestra-1,3,5(10)-trien-3,17β-diol, 1 g. of p-toluene sulfonic acid monohydrate, 50 ml. of acetic acid and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate evaporated under vacuum to obtain the title product as residue, which is then refined by crystallization from methanol.

EXAMPLE 15

17β-acetoxy-17α-ethyl-9α-methylestra-1,3,5(10)-trien-3-ol

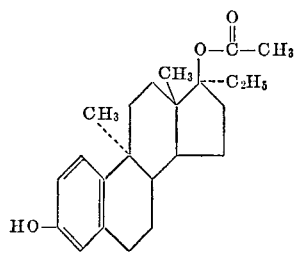

1 g. of 3,17β-diacetoxy-17α-ethyl-9α-methylestra-1,3,5(10)-triene in 40 ml. of methanol at about 0°. 500 mg. of potassium hydroxide in 100 ml. of water cooled to about 0° is then added thereto, and the reaction mixture maintained at 0° for 24 hours. The reaction mixture is then poured into ice-water, the crude title compound separates and is collected by filtration, water washed and refined by crystallization from methanol-ether (1:1).

EXAMPLE 16

17β-acetyl-3-methoxy-9α-methylestra-1,3,5(10)-triene

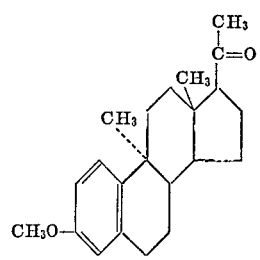

This example illustrates the preparation of a compound X by Process VI.

Step A.—17-ethylidene-3-methoxy - 9α - methylestra-1,3,5(10)-triene. (A compound VII by Process VI, step (a))

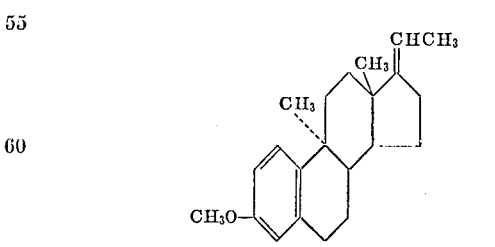

To a (25°) solution of dimethylsulfinyl sodium, prepared in the usual way from 2.4 g. of sodium hydride in 45 ml. of dimethyl sulfoxide, there is rapidly added a solution of 22.4 g. of ethyltriphenylphosphonium iodide in 90 ml. of dimethyl sulfoxide. To the deep red admixture 4.0 g. of 3-methoxy-9α-methylestra-1,3,5(10)-trien-17-one is added and kept at 60° for 18 hours. After pouring on ice (200 g.) the product is extracted with petroleum ether and purified by filtration of the petroleum ether solution through 13 g. of alumina (Grade I).

Step B.—17β-(1'-hydroxyethyl)-3-methoxy-9α-methylestra-1,3,5(10)-triene. (A compound IX by Process VI, step (b))

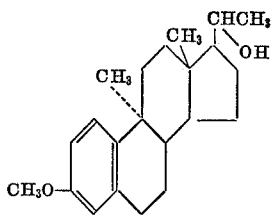

A solution of 17-ethylidene-3-methoxy-9α-methylestra-1,3,5(10-triene (500 mg.) in 30 ml. of tetrahydrofuran is treated with 2.5 ml. of 1.0 M commercial borane/tetrahydrofuran solution. After at room temperature for 90 minutes, 6.1 ml. of 10% sodium hydroxide solution is added, then, dropwise at 0°, 2.5 ml. of 30% hydrogen peroxide. After 1.5 hours at 0°, water (100 ml.) is added and the product extracted with ether.

Step C.—17β-acetyl-3-methoxy-9α-methylestra-1,3,5(10) triene (Process VI, step (c))

To a mixture of 260 mg. of chromium trioxide in 10 ml. of pyridine, 302 mg. of 17β-(1'-hydroxyethyl)-3-methoxy-9α-methylestra-1,3,5(10)-triene is added and kept 18 hours at 25°. Ic is added and the product extracted with benzene; the benzene solutions are filtered through a short column (10 g.) of alumina (Grade 1–11), evaporated to dryness, and the product crystallized from acetone-hexane.

Carrying the procedure of each of steps a, b and c of this Example (16) is repeated, but replacing the starting material, i.e. 3-methoxy-9α-methylestra-1,3,5(10)-trien-17-one, with 13-ethyl-3-methoxy-9α-methylgona-1,3,5(10) trien-17-one there is obtained the corresponding compound X, i.e. 17β-acetyl-13-ethyl-3-methoxy-9α-methylestra-1,3,5(10)-triene.

What is claimed is:
1. A compound of the formula:

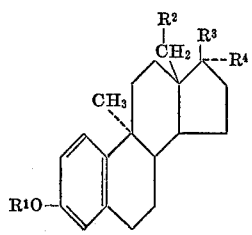

wherein

R¹ is a hydrogen atom, tetrahydropyran-2-yl, tetrahydrofuran-2-yl, carboxylic acyl, lower alkyl or cycloalkyl;
R² is a hydrogen atom or alkyl having from 1 to 2 carbon atoms;
R³ is hydroxy or acyloxy;
R⁴ is hydrogen, alkyl having from 1 to 3 carbon atoms or alkynyl having from 2 to 3 carbon atoms;

R³ and R⁴ taken together can also represent a keto group; or R⁴ is a hydrogen atom and R³ is acetyl.

2. A compound of claim 1 wherein R³ and R⁴ taken together are a keto group.

3. The compound of claim 2 which is 3-methoxy-9α-methylestra-1,3,5(10)-trien-17-one.

4. A compound of the formula:

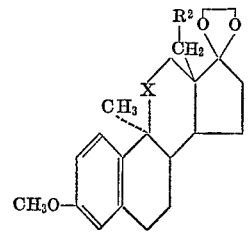

wherein

R² is a hydrogen atom, or alkyl having from 1 to 2 carbon atoms; and
X is a carbonyl unit or a methylene unit.
5. A compound of claim 4 wherein X is a carbonyl unit.
6. The compound of claim 5 which is 17-ethylenedioxy-3-methoxy-9α-methylestra-1,3,5(10)-trien-11-one.
7. A compound of claim 4 wherein X is a methylene unit.
8. The compound of claim 7 which is 17-ethylenedioxy-3-methoxy-9αmethylestra-1,3,5(10)-triene.
9. A process for the preparation of a compound of the formula:

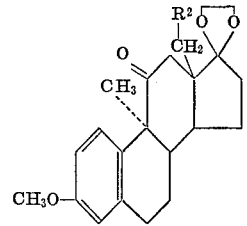

wherein R² is a hydrogen atom, or alkyl having from 1 to 2 carbon atoms, which comprises reacting a compound of the formula:

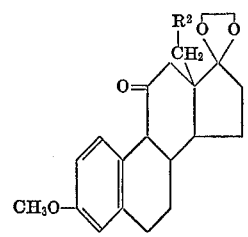

wherein R² is as defined above, with a methylating agent of the formula

CH₃—Z wherein Z is a halogen atom having an atomic weight of from 35 to 127, tosylate or —OSO₃CH₃;
in the presence of a strong base of the formula

M—A wherein M is an alkali metal; and A is lower alkoxy having from 1 to 6 carbon atoms, —H, NH₂ or

—CH₂SO—CH₃

10. A process of claim 9 wherein the methylating agent is methyl iodide.
11. A process of claim 10 wherein the strong base is an alkali metal alkoxide.

References Cited
UNITED STATES PATENTS
2,874,173   2/1959   Hogg et al. _____ 260—397.45

OTHER REFERENCES
Jones et al. Chem. Soc. Jour. pp. 2156–57 (1958).
Beyler et al. J. Org. Chem. pp. 2426–29 (1961).
Applezweig, Steriod Drugs II p. 135 (1964).

HENRY A. FRENCH, Primary Examiner

U.S. Cl. X.R.
260—239.55 R, 397.45, 397.5; 424—238